(12) United States Patent
Suzuki

(10) Patent No.: US 8,924,696 B2
(45) Date of Patent: Dec. 30, 2014

(54) IMAGE PROCESSING DEVICE HAVING A PLURALITY OF CONTROL UNITS

(75) Inventor: Nobuhiko Suzuki, Nagoya (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 625 days.

(21) Appl. No.: 12/792,480

(22) Filed: Jun. 2, 2010

(65) Prior Publication Data

US 2011/0078422 A1    Mar. 31, 2011

(30) Foreign Application Priority Data

Sep. 30, 2009 (JP) ................. 2009-227645

(51) Int. Cl.
| | | |
|---|---|---|
| *G06K 15/00* | (2006.01) | |
| *G03G 15/00* | (2006.01) | |
| *G06F 1/32* | (2006.01) | |
| *G06K 15/02* | (2006.01) | |

(52) U.S. Cl.
CPC ............ *G06K 15/00* (2013.01); *G03G 15/5004* (2013.01); *G06F 1/3203* (2013.01); *G06F 1/3215* (2013.01); *G06F 1/3284* (2013.01); *G06K 15/18* (2013.01); *G03G 2215/0697* (2013.01); *Y02B 60/1267* (2013.01); *Y02B 60/32* (2013.01)
USPC .......................................... 712/229; 399/388

(58) Field of Classification Search
CPC ................................................. B65H 2220/02
USPC .................................... 399/388; 712/220
See application file for complete search history.

(56) References Cited

U.S. PATENT DOCUMENTS

| | | | |
|---|---|---|---|
| 6,711,447 B1 | 3/2004 | Saeed | |
| 6,851,781 B2 * | 2/2005 | Yokoyama | ....................... 347/14 |
| 7,492,479 B2 * | 2/2009 | Machida | ........................ 358/1.9 |
| 8,200,994 B2 * | 6/2012 | Shibasaki | ..................... 713/300 |
| 8,248,629 B2 * | 8/2012 | Fukuda | ......................... 358/1.14 |
| 2009/0040553 A1 | 2/2009 | Minami et al. | |

FOREIGN PATENT DOCUMENTS

| | | |
|---|---|---|
| CN | 101365031 A | 2/2009 |
| JP | H08-101609 A | 4/1996 |
| JP | 2001-010125 A | 1/2001 |
| JP | 2001-201986 A | 7/2001 |
| JP | 2002-086844 A | 3/2002 |
| JP | 2004-005029 A | 1/2004 |

(Continued)

OTHER PUBLICATIONS

Japan Patent Office, Office Action for Japanese Patent Application No. 2009-227645 (counterpart to above-captioned patent application), mailed Jul. 14, 2011.

(Continued)

*Primary Examiner* — Andrew Caldwell
*Assistant Examiner* — Benjamin Geib
(74) *Attorney, Agent, or Firm* — Merchant & Gould PC

(57) ABSTRACT

An image processing device includes an operating unit and a plurality of control units each configured to control the operating unit in order to execute a function on image data. The plurality of control units include at least a first control unit and a second control unit. When a first mode is selected, the control units control the operating unit to execute the function in cooperation with each other. When a second mode is selected, at least the second control unit controls the operating unit to execute the function without cooperating with the first control unit.

12 Claims, 6 Drawing Sheets

(56) References Cited

FOREIGN PATENT DOCUMENTS

| JP | 2005-275771 A | 10/2005 |
|---|---|---|
| JP | 2007-047966 A | 2/2007 |
| JP | 2007-105917 A | 4/2007 |
| JP | 2009-146243 A | 7/2009 |

OTHER PUBLICATIONS

The State Intellectual Property Office of the People'S Republic of China, Notification of First Office Action for Chinese Patent Application No. 201010224872.8 (counterpart Chinese patent application), issued Nov. 12, 2012.

State Intellectual Property Office of the People'S Republic of China, Notification of Third Office Action for Chinese Patent Application No. 201010224872.8 (counterpart of the above-captioned patent application), mailed Dec. 19, 2013.

State Intellectual Property Office of the People'S Republic of China, Notification of Second Office Action for Chinese Patent Application No. 201010224872.8 (counterpart to above-captioned patent application), mailed Jul. 1, 2013.

Decision on Rejection of Chinese Patent Application No. 201010224872.8 issued Jun. 23, 2014.

* cited by examiner

FIG.2

DEVICE TABLE

| DEVICE | OPERATING FREQUENCY (MHz) |
|---|---|
| PRINTING UNIT | 100 |
| IMAGE PROCESSING UNIT | 20 |
| SCANNER UNIT | 12 |
| FACSIMILE UNIT | 10 |
| OPERATION UNIT | 2 |
| NETWORK I/F | 1 |

FIG.3

FUNCTION TABLE

| FUNCTION | REQUIRED DEVICE |
|---|---|
| PC PRINT | PRINTING UNIT · IMAGE PROCESSING UNIT · NETWORK I/F |
| COPY | OPERATION UNIT · SCANNER UNIT · PRINTING UNIT · IMAGE PROCESSING UNIT |
| FACSIMILE PRINT | OPERATION UNIT · PRINTING UNIT |
| SCANNER | OPERATION UNIT · SCANNER UNIT |
| FACSIMILE COMMUNICATION | OPERATION UNIT · FACSIMILE UNIT |

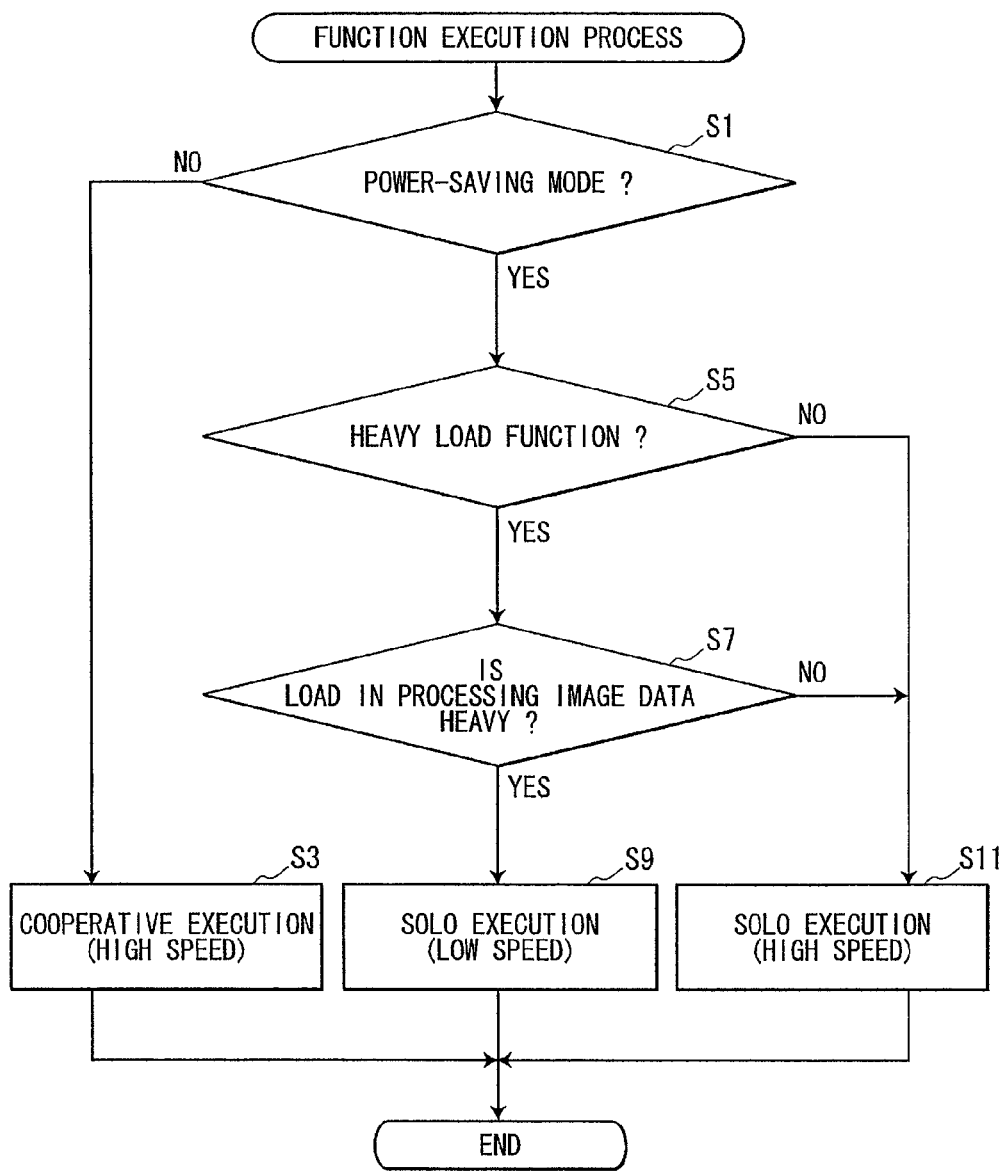

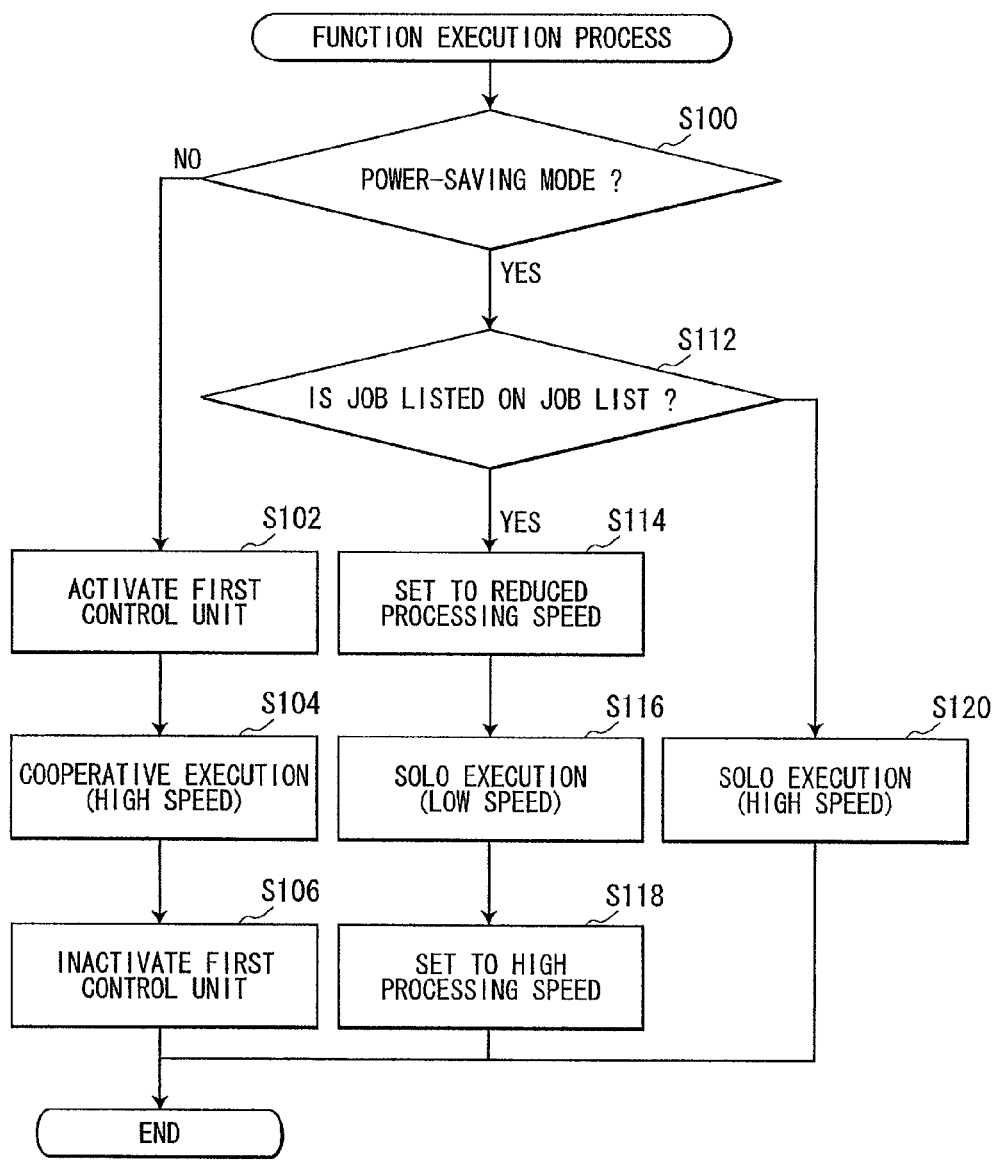

FIG.6

JOB LIST

- COLOR COPY
- COLOR PC PRINTING
- MONOCHROMATIC HIGH-RESOLUTION PC PRINTING
- MULTI-TONE IMAGE READING

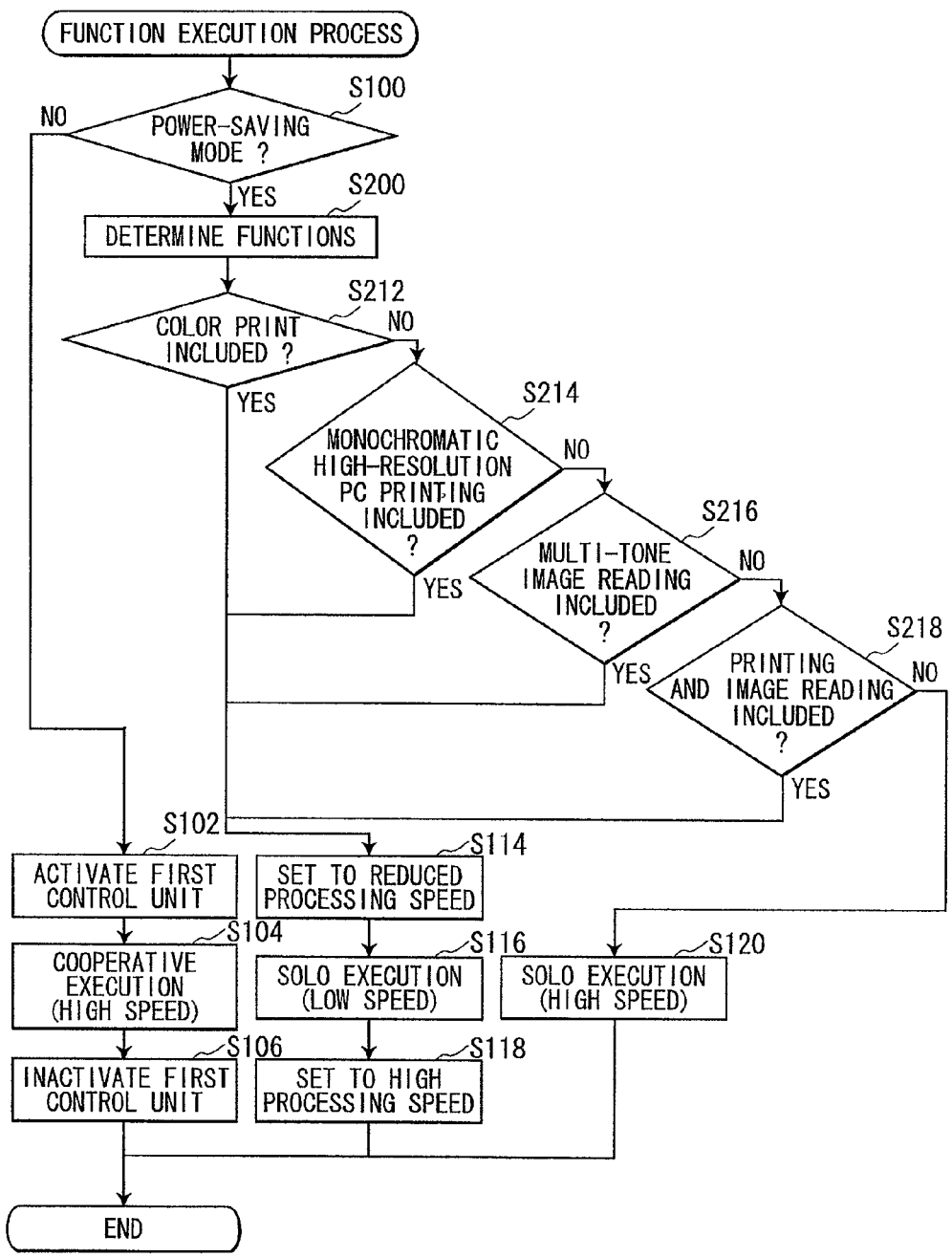

IMAGE PROCESSING DEVICE HAVING A PLURALITY OF CONTROL UNITS

CROSS REFERENCE TO RELATED APPLICATION

This application claims priority from Japanese Patent Application No. 2009-227645 filed Sep. 30, 2009. The entire content of this priority application is incorporated herein by reference.

TECHNICAL FIELD

The present invention relates to an image processing device and a storage medium storing a control program for controlling the image processing device.

BACKGROUND

Japanese Patent-Application Publication No. H8-101609 has proposed an image processing device including a main control unit and a sub-control unit. The main control unit controls each of various units, such as a printer unit, and the sub-control unit controls an interface for communicating with external devices. During a power-saving mode, the main control unit is placed in a sleep state, and only the sub-control unit is in a running state. This configuration reduces power consumption in the power-saving mode.

SUMMARY

However, functions that can be executed when only the sub-control unit is running are so limited that the above configuration is not satisfactorily user friendly.

In view of the foregoing, it is an object of the invention to provide an image processing device capable of avoiding limiting functions executable under the control of one or more of a plurality of control units. It is also an object of the invention to provide a storage medium storing a program for controlling the image processing device.

In order to attain the above and other objects, the invention provides an image processing device including an operating unit, a plurality of control units, and a selecting unit. Each of the plurality of control units includes a processing unit and is configured to control the operating unit in order to execute a target function on image data. The plurality of control units includes at least a first control unit and a second control unit. The selecting unit selects one of a first mode and a second mode. When the first mode is selected, the plurality of control units control the operating unit to execute the target function in cooperation with each other. When the second mode is selected, at least the second control unit controls the operating unit to execute the target function without cooperating with the first control unit.

According to another aspect, the present invention provides a storage medium storing a set of program instructions executable on an image processing device and usable for controlling the image processing device. The image processing device includes an operating unit and a plurality of control units. The plurality of control units include at least a first control unit and a second control unit. Instructions include selecting one of a first mode and a second mode, controlling the plurality of control units to control the operating unit so as to execute a function on image data in cooperation with each other when the first mode is selected, and controlling at least the second control unit to control the operating unit so as to execute the function without cooperating with the first control unit when the second mode is selected.

BRIEF DESCRIPTION OF THE DRAWINGS

The particular features and advantages of the invention as well as other objects will become apparent from the following description taken in connection with the accompanying drawings, in which:

FIG. 2 is a view showing a device table according to the first embodiment of the invention;

FIG. 3 is a view showing a function table according to the first embodiment of the invention;

FIG. 4 is a flowchart representing a function execution process according to the first embodiment of the invention;

FIG. 5 is a flowchart representing a function execution process according to a second embodiment of the invention;

FIG. 6 is a view showing a job list according to the second embodiment of the invention; and FIG. 7 is a flowchart representing a function execution process according to a third embodiment of the invention.

DETAILED DESCRIPTION

Figure 1:
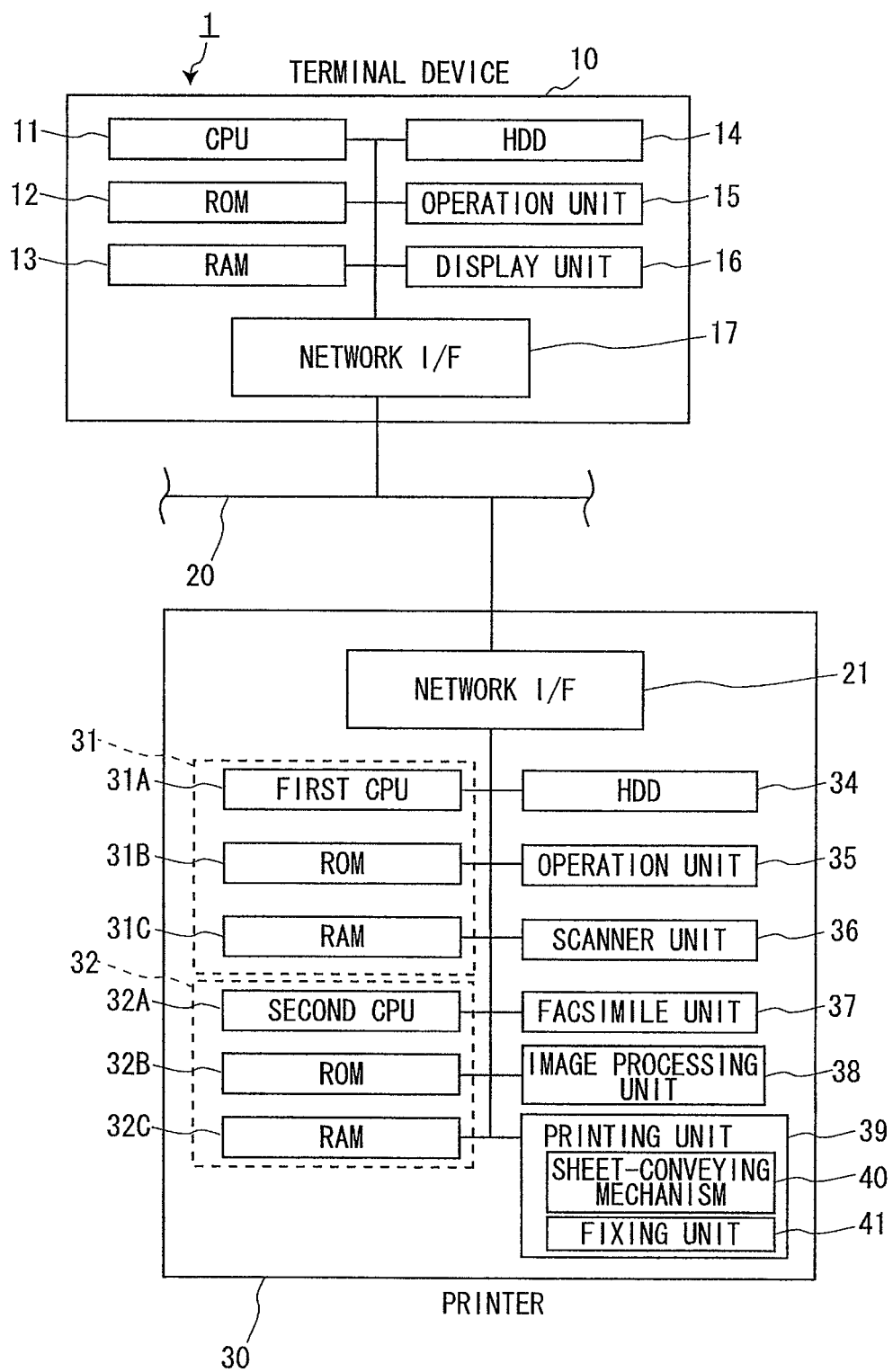
FIG. 1 is a block diagram showing electrical configuration of an image processing system according to a first embodiment of the invention.

Image processing systems according to embodiments of the invention will be described while referring to the accompanying drawings wherein like parts and components are designated by the same reference numerals to avoid duplicating description.

First Embodiment

As shown in FIG. 1, an image processing system 1 according to a first embodiment of the invention includes a terminal device 10 and a printer 30 (image processing device). The terminal device 10 may be a personal computer, for example.

The terminal device 10 includes a CPU 11, a ROM 12, a RAM 13, a hard disk drive (HDD) 14, an operation unit 15, a display unit 16, and a network interface (I/F) 17. Although not shown in the drawings, the operation unit 15 includes a keyboard and a pointing device, and the display unit 16 includes a liquid crystal display panel. The network I/F 17 is connected to a communication circuit 20. The HDD 14 stores various programs including an operation system (OS), an application software for generating image data to be printed, and a printer driver for controlling the printer 30. The CPU 11 performs overall control of the terminal device 10 based on a program read from the ROM 12 while storing processed results in the RAM 13.

The printer 30 is a multifunction device capable of executing a plurality of functions including a PC print function, a copy function, a scanner function, a facsimile communication function, and a facsimile print function. The printer 30 includes a first control unit 31, a second control unit 32, and a HDD 34. The first control unit 31 includes a first CPU 31A, a ROM 31B, and a RAM 31C. The second control unit 32 includes a second CPU 32A, a ROM 32B, and a RAM 32C Each of the ROM 31B and the ROM 32B stores various programs for controlling the printer 30. Each of the first CPU 31A and the second CPU 32A performs overall control of the printer 30 based on a program read from the respective ROM 31B, 32B while storing processed results into the respective RAM 31C, 32C.

The first and second control units 31 and 32 have substantially the same performance level. More specifically, both the first and second control units 31 and 32 have substantially the same operating frequency (100 MHz, in this embodiment), and the RAMs 31C and 32C have substantially the same memory capacity.

The printer 30 further includes various devices (operating units) including a network I/F 21, an operation unit 35, a scanner unit 36, a facsimile unit 37, an image processing unit 38, and a printing unit 39.

The network I/F 21 is connected to the terminal device 10 and the like through the communication circuit 20, enabling data communication therebetween. Although not shown in the drawings, the operation unit 35 includes various buttons through which a user inputs various commands including an execution command for each function. The operation unit 35 also includes a display unit (liquid crystal display panel, for example) and a lamp, and is capable of displaying various setting screens and operation status.

The scanner unit 36 generates scanned data by scanning an original (not shown). The facsimile unit 37 transmits facsimile data to or receives facsimile data from a remote facsimile device (not shown). The image processing unit 38 image-processes various image data. For example, the image processing unit 38 converts the image data into printable data. The image data may be scanned data generated by the scanner unit 36, print data received at the network I/F 21, or the like.

The printing unit 39 forms an image on a recording sheet (paper sheet, OHP sheet, or the like) based on the image data in an electrophotographic method, for example. The printing unit 39 includes a sheet-conveying mechanism 40 and a fixing unit 41. The sheet-conveying mechanism 40 picks up recording sheets one at a time from a sheet tray (not shown) and conveys the same to a printing section (not shown), in accordance with a print start command from the first or second control unit 31, 32. Each of the first and second control units 31 and 32 is capable of controlling the sheet-conveying mechanism 40 to change a sheet conveying speed as needed. The fixing unit 41 thermally fixes toner images transferred onto the recording sheet. Each of the first and second control units 31 and 32 is capable of controlling the amount of heat (temperature) generated at the fixing unit 41 by controlling the amount of electric supply to the fixing unit 41.

FIG. 2 shows a device table, which is stored in the HDD 34, for example. The device table shows operating frequencies (clock numbers) required to operate each of the devices (the printing unit 39, the image processing unit 38, the scanner unit 36, the facsimile unit 37, the operation unit 35, and the network I/F 21). As mentioned above, the operating frequencies of the first and second control units 31 and 32 are both 100 MHz. Thus, as will be understood from the device table shown in FIG. 2, each of the first and second control units 31 and 32 is capable of operating any of the devices by itself.

FIG. 3 shows a function table, which is stored in the HDD 34, for example. The function table identifies devices required for each function. Specifically, in the PC print function, the network I/F 21 receives print data from the terminal device 10, and the image processing unit 38 image-processes the print data (expands the print data into bitmap data, for example), and the printing unit 39 forms a print-object image on a recording medium. Thus, the network I/F 21, the image processing unit 38, and the printing unit 39 are required for the PC print function.

In the copy function, the operation unit 35 accepts a copy request from a user, and the scanner unit 36 generates scanned data by scanning an original, and the image processing unit 38 image-processes the scanned data, and the printing unit 39 prints a scanned image on a recording medium. Thus, the operation unit 35, the scanner unit 36, the image processing unit 38, and the printing unit 39 are required for the copy function.

In the scanner function, the operation unit 35 accepts a scan request from a user, and the scanner unit 36 generates scanned data of an original. Thus, the operation unit 35 and the scanner unit 36 are required for the scanner function. In the facsimile communication function, the operation unit 35 accepts a facsimile communication request from a user, and the facsimile unit 37 exchanges facsimile data between a remote facsimile device. Thus, the operation unit 35 and the facsimile unit 37 are required for the facsimile communication function. In the facsimile print function, the operation unit 35 accepts a facsimile print request from a user, and the printing unit 39 forms an image on a recording medium based on previously-received facsimile data. Thus, the operation unit 35 and the printing unit 39 are required for the facsimile print function.

The printer 30 has a high-speed mode, a power-saving mode, and a sleep mode. A user can select one of the high-speed mode and the power-saving mode through manipulation on the operation unit 15 or 35, and the second control unit 32 stores selected mode settings into the HDD 34, for example, thereby setting the printer 30 to the selected mode.

When the printer 30 is in the high-speed mode, both the first control unit 31 and the second control unit 32 are in the running state and control each of the devices in cooperation with each other. Thus, the first control unit 31 and the second control unit 32 can execute at a high speed even functions that impose heavy load. When the printer 30 is in the power-saving mode, on the other hand, the first control unit 31 is in a sleep state, and only the second control unit 32 is in the running state and controls each device by itself. This saves power consumption while keeping each function executable in the power-saving mode.

The printer 30 enters the sleep mode from either the high-speed mode or the power-saving mode when a predetermined condition to enter the sleep mode is met. The predetermined condition may be such that a predetermined time duration elapses without print data is received from the terminal device 10 nor facsimile data is received from a remote facsimile device. When a user performs a predetermined operation on the operation unit 35 or the terminal device 10 while the printer 30 is in the sleep mode, then the printer 30 returns to either the high-speed mode or the power-saving mode. When the printer 30 is in the sleep mode, none of the functions are executable. In this aspect, the sleep mode differs from the high-speed mode and the power-saving mode.

A function execution process will be described with reference to the flowchart shown in FIG. 4. The function execution process is executed upon receiving a job command. More specifically, when a user operates the operation unit 35 or the terminal device 10 to input an execution command for any of the above-mentioned functions of the printer 30, then the second control unit 32 detects an instruction signal generated based on the execution command. As a result, the function execution process is executed based on a program stored in the ROM 31B, for example. The function execution process is executed by either the first and second control units 31 and 32 or the second control unit 32 by itself.

In the function execution process, first in S1, the second control unit 32 (the second CPU 32A) determines whether or not the printer 30 is in the power-saving mode based on the selected mode settings stored in the HDD 34.

If it is determined in S1 that the printer 30 is in the high-speed mode (S1:No), then in S3 the second control unit 32 executes in a cooperative execution mode a function corresponding to the execution command (hereinafter referred to as "target function") in cooperation with the first control unit 31 at a high speed, and ends the current process.

For example, if the target function is the PC print function, then in S3 the second control unit 32 controls the network I/F 21 and the printing unit 39, and the first control unit 31 controls the image processing unit 38, so a print data receiving process under the control of the second control unit 32 and the image-processing process under the control of the first control unit 31 are executed in parallel, and the image-processing process under the control of the first control unit 31 and a printing process under the control of the second control unit 32 are executed in parallel. Thus, the PC print function can be executed at a higher speed than in the power-saving mode described later.

Also, if the target function is the copy function, then in S3 the second control unit 32 controls the operation unit 35 and the image processing unit 38, and the first control unit 31 controls the scanner unit 36 and the printing unit 39, for example. As a result, the copy function can be executed at a higher speed than in the power-saving mode. Although the first and second control units 31 and 32 may also execute each of the scanner function, the facsimile communication function, and the facsimile print function in cooperation with each other, either the first control unit 31 or the second control unit 32 executes each of these functions by itself in this embodiment.

Note that allocation of the devices to the first and second control units 31 and 32 is not limited to that described above. The devices may be allocated not to exceed the maximum operating frequency (i.e., 100 MHz, in this embodiment) of each control unit 31, 32. For example, if the target function is the PC print function, then the second control unit 32 may control the network I/F 21 and the image processing unit 38, and the first control unit 31 may control the printing unit 39.

By allocating in this manner, each of the first and second control units 31 and 32 can control the device(s) within the maximum operating frequency, so each of the control units 31 and 32 can control a device regardless of whether the other of the control units 31 and 32 is controlling a different device at the same time. In other words, a device can perform operations independently from operations by different devices.

If it is determined in S1 that the printer 30 is in the power-saving mode (S1:Yes), then in S5 the second control unit 32 determines whether or not the target function is a heavy load function. If so (S5:Yes), then the second control unit 32 proceeds to S7. On the other hand, if the target function is a light load function (S5:No), then the second control unit 32 proceeds to S11.

Note that the heavy load function is a function that is executed by operating devices of relatively high operating frequencies. Examples of the heavy load function include the PC print function, the copy function, and the facsimile print function. On the other hand, the light load function is a function that can be executed by only operating devices of relatively low operating frequencies, and examples include the scanner function and the facsimile communication function.

In S11, the second control unit 32 executes in a solo execution mode the target function (light load function) by itself at substantially the same speed as in the high-speed mode, and then ends the current process. Because the light load function is executable by only operating devices of relatively low operating frequencies as described above, a load in executing the light load function is relatively small. Thus, the second control unit 32 can execute the target function (light load function) at a high speed even by itself.

In S7, the second control unit 32 determines whether a load in processing image data corresponding to the target function is heavy, based on attribute information of the image data. The second control unit 32 determines in S7 that the load in processing the image data is heavy if any of attributes of the image data (resolution, data amount, number of toner colors, and the like) is equal to or greater than a predetermined threshold value, and determines that the load in processing the image data is light if each of the attributes is less than the predetermined threshold value.

If a positive determination is made in S7 (S7:Yes), then in S9 the second control unit 32 executes in the solo execution mode the target function (heavy load function) at a lower speed than that in the high-speed mode by itself, and ends the current process. That is, because the heavy load function needs a device of high operating frequency to operate as described above, a load in executing the target function (heavy load function) is relatively heavy. Also, the load in processing the image data is also heavy. Thus, the second control unit 32 cannot execute the heavy load function at a high speed by itself.

For example, the second control unit 32 controls in S9 the sheet-conveying mechanism 40 to convey a recording sheet at a lower speed than that in the high-speed mode. Lowering the conveying speed further reduces power consumption. Also, lowering the conveying speed enables the fixing unit 41 to thermally fix the toner images onto the recording sheet at a lower heat (temperature). Thus, the second control unit 32 controls the fixing unit 41 to generate lower heat (temperature) than for in the high-speed mode. Lowering the amount of heat further reduces power consumption.

On the other hand, if a negative determination is made in S7 (S7:No), then the second control unit 32 proceeds to S11 described above. In this case, a load in executing the heavy load function is relatively heavy, but a load in processing the image data is relatively light. Thus, the second control unit 32 can execute the heavy load function at a high speed by itself. Thus, the second control unit 32 controls the sheet-conveying mechanism 40 to convey a recording medium at substantially the same speed as in the high-speed mode and controls the fixing unit 41 to generate as much heat as in the high-speed mode.

As described above, according to the present embodiment, in the high-speed mode, i.e., when neither the first control unit 31 nor the second control unit 32 has decreased in the operating capability, the first control unit 31 and the second control unit 32 control the devices in cooperation with each other, so functions can be executed at a high speed. On the other hand, in the power-saving mode, i.e., when the operating capability of the first control unit 31 has decreased, the second control unit 32 controls the devices by itself. Thus, the functions that can be executed in the power-saving mode are not limited, enhancing the convenience.

It is conceivable to always set an operation speed of each device to a lower speed for the solo execution mode, regardless of the magnitude of load in executing each function. However, in this case, execution of function may be always slow. According to the present embodiment, however, the operation speed is set to a lower speed only if the load in executing the target function is heavy, preventing the operation speed from being lowered unnecessarily.

Second Embodiment

Next, a second embodiment of the invention will be described. In this embodiment, the printer 30 enters the power-saving mode from the high-speed mode immediately after any function is executed in the high-speed mode, and waits in the power-saving mode until a new job command is received. Also, the printer 30 records one of the high-speed mode and the power-saving mode selected by the user as a selected mode in the HDD 34, for example.

A function execution process according to the second embodiment will be described with reference to the flowchart of FIG. 5. The function execution process of FIG. 5 is started upon receiving a job command for a job (current job). The printer 30 is in the power-saving mode at the time of when the function execution process is started.

First in S100, the second control unit 32 (the second CPU 32A) determines whether or not the selected mode stored in the HDD 34 is the power-saving mode. If not (S100:No), then in S102 the second control unit 32 sets the first control unit 31 into the running state, so the printer 30 enters the high-speed mode. Next in S104, the first and second control units 31 and 32 together process the job (printing, copying, facsimile transmission, or the like) at a higher processing speed. That is, the second control unit 32 executes in the cooperative execution mode the current job in cooperation with the first control unit 31 at the high speed. Then, in S106, the second control unit 32 sets the first control unit 31 to the sleep state. Note that when the first control unit 31 is set to the sleep state, the first control unit 31 enters a standby state in which the first control unit 31 waits for an interruption signal. Alternatively, at least some clocks are not supplied to the first control unit 31, or still alternatively power to the first control unit 31 is cut off partially or completely. As a result, the printer 30 enters the power-saving mode. Then, the second control unit 32 ends the function execution process.

On the other hand, if the selected mode is the power-saving mode (S100:Yes), then in S112 the second control unit 32 determines whether or not the current job is listed on a job list shown in FIG. 6.

The job list indicates jobs that the second control unit 32 can only process in a reduced processing speed by itself. In this embodiment, the jobs listed on the job list are color copy, color PC printing, monochromatic high-resolution PC printing, and multi-tone image reading. The job list is stored in the HDD 34, for example.

If a positive determination is made in S112 (S112:Yes), then in S114 the second control unit 32 sets the scanner unit 36 and the printing unit 39 into a reduced-speed mode, i.e., sets the processing speed to the reduced processing speed. Then, in S116, the second control unit 32 executes the current job at the reduced processing speed. That is, the second control unit 32 executes in the solo execution mode the current job at the lower speed Next, in S118, the second control unit 32 sets the scanner unit 36 and the printing unit 39 into a normal-speed mode, i.e., sets the processing speed to the higher processing speed. Then, the second control unit 32 ends the function execution process.

On the other hand, if a negative determination is made in S112 (S112:No), this means that the second control unit 32 can execute the current job at the higher processing speed by itself, so in S120 the second control unit 32 executes the current job at the higher processing speed. That is, the second control unit 32 executes in the solo execution mode the current job at the high speed by itself. Then, the second control unit 32 ends the function execution process.

As described above, according to the second embodiment, the printer 30 waits for a next job command in the power-saving mode regardless of whether the high-speed mode or the power-saving mode is selected by the user. If the selected mode is the power-saving mode, and if the current job is listed on the job list shown in FIG. 6, this means that the second control unit 32 alone (the printer 30 in the power-saving mode) cannot execute the current job at the higher processing speed. Thus, in this case, the second control unit 32 executes the current job at the reduced processing speed. More specifically, a sheet feeding speed in which the sheet-conveying mechanism 40 of the printing unit 39 feeds recording sheets and a scanning speed in which the scanner unit 36 scans images on original are reduced. Reducing the processing speed reduces the data amount that the second control unit 32 needs to process in unit of time and thus enables the second control unit 32 to execute the current job by itself.

Note that the higher processing speed is a speed at which the second control unit 32 cannot process by itself, and the reduced processing speed is a speed at which the second control unit 32 can process by itself and is lower than the higher processing speed. The first and second control units 31 and 32, i.e., the printer 30 in the high-speed mode, can process at the higher processing speed.

Third Embodiment

Next, a third embodiment of the invention will be described. In the above-described second embodiment, the processing speed is reduced if the current job is listed on the job list. However, in the third embodiment, the processing speed is reduced if the current job includes a process that imposes relatively heavy load. Details will be described next.

A function execution process according to the third embodiment will be described with reference to the flowchart of FIG. 7. The function execution process of FIG. 7 is similar to the function execution process of FIG. 5, but differs in including processes of S200 to S218 instead of the process of S112.

In the function execution process of FIG. 7, if it is determined in S100 that the selected mode is the power-saving mode (S100:Yes), then in S200 the second control unit 32 detects processes included in the current job. Then in S212 the second control unit 32 determines whether or not the processes detected in S200 include a color printing process. If so (S212:Yes), then the second control unit 32 proceeds to S114. On the other hand, if not (S212:No), then in S214 the second control unit 32 determines whether or not the processes detected in S200 include a monochromatic high-resolution PC printing process. If so (S214:Yes), then the second control unit 32 proceeds to S114. On the other hand, if not (S214:No), then in S216 the second control unit 32 determines whether or not the processes detected in S200 includes a multi-tone image reading process. If so (S216:Yes), then the second control unit 32 proceeds to S114. On the other hand, if not (S216:No), then in S218 the second control unit 32 determines whether or not the processes detected in S200 include a printing process and an image reading process. If so (S218:Yes), then the second control unit 32 proceeds to S114. On the other hand, if not (S218:No), then the second control unit 32 proceeds to S120.

According to this embodiment, if the current job includes any process that imposes relatively heavy load or if the current job includes a predetermined combination of processes, then the current job is executed in the reduced processing speed in the power-saving mode.

<Modifications>

While the invention has been described in detail with reference to the embodiments thereof, it would be apparent to those skilled in the art that various changes and modifications may be made therein without departing from the spirit of the invention.

For example, in the above-described embodiments, the printer 30 which is a multifunction device is described as an example of image processing device. However, the image processing device is not limited to the printer 30, but may be a printer without scanner function or facsimile function, a facsimile device, or an image processing device, as long as the device can execute a plurality of functions on image data. Also, the image processing device may be an inkjet-type image forming device.

In the above-described embodiments, the copy function, the scanner function, the facsimile communication function and the like are described as functions of the image processing device. However, this is not limitation of the invention. The image processing device may have an image storing function for storing image data into the HDD 34 and/or a specific image extracting function for extracting a specific image from scanner data, for example, as long as the function is to be executed on image data.

In the above-described embodiments, either the cooperative execution mode or the solo execution mode is selected based on the mode (the high-speed mode or the power-saving mode) selected by the user. However, either the cooperative execution mode or the solo execution mode may be automatically selected based on whether a predetermined switching condition is met. For example, users or time and/or date may be registered for each of the cooperative execution mode and the solo execution mode, and these modes may be switched therebetween based on a user or a time and/or date. Alternatively, the solo execution mode may be selected when the control capability of the first control unit 31 has decreased. The control capability of the first control unit 31 may decrease when the first control unit 31 starts malfunctioning, for example. In this case, it is conceivable to provide a detecting unit (watch dog, for example) for detecting whether or not the first control unit 31 is running normally based on a number of clocks outputted from the first control unit 31, and to have the second control unit 32 determine whether the first control unit 31 is malfunctioning based on the detection results from the detecting unit.

In the above-described embodiments, the first control unit 31 and the second control unit 32 have substantially the same performance level. However, the first control unit 31 and the second control unit 32 may have different performance levels. For example, the first control unit 31 may have the operating frequency of 200 MHz and function as a main control unit, and the second control unit 32 may have the operating frequency of 10 MHz and function as a sub-control unit.

In the above described embodiment, the printer 30 having the two control units (31, 32) are described as an example of the image processing device. However, the image processing device may have more than two control units. For example, at least two of more than two control units may execute functions in the cooperative execution mode in the high-speed mode, and less number of control units (excluding a control unit with decreased control capability) may execute in the solo or cooperative execution mode in the power-saving mode.

In the above-described embodiments, the first control unit 31 and the second control unit 32 control different devices in the cooperative execution mode. However, the first control unit 31 and the second control unit 32 may share in the control of the same devices (the image processing unit 38 and the printing unit 39, for example). For example, the first control unit 31 may execute image processing on part of image data (expansion into bitmap data, for example), and the second control unit 32 may execute the image processing on the rest of the image data at the same time.

In the above-described first embodiment, it is determined whether the load in processing image data is heavy (S7) only when it has been determined that the load in executing the target function is heavy (S5:Yes). However, determination on whether the load in processing image data may be made even if it has been determined that the load in executing the target function is light, and the target function may be executed in the solo execution mode at one of different speeds selected based on whether the load is heavy or light. Alternatively, the target function may be executed in the solo execution mode at one of different speeds selected based on magnitude of total load determined based on combination of the load in executing the target function and the load in processing image data.

In the above-described embodiments, the target function is executed either one of two different speeds. i.e., high speed or low speed depending on the magnitude of loads. However, the target function may be executed at a speed selected from among three or more different speeds. Also, in the above-described embodiments, the sheet conveying speed is described as an example of operation speed that changes depending on the mode. However, a scanning speed of a scan head (not shown) of the scanner unit 36 may be changed as the operation speed depending on the mode.

The printer 30 described above has three different modes, i.e., the high-speed mode, the power-saving mode, and the sleep mode. However, the printer 30 may have more than three modes. For example, the printer 30 may have a medium speed mode in addition to these three modes and execute functions at different speeds in each mode (excluding the sleep mode).

What is claimed is:

1. An image processing device comprising:
an operating unit comprising:
an image forming unit configured to form an image on a sheet, and
a feeding unit configured to feed the sheet through the image forming unit at a first feeding speed and a second feeding speed, the second feeding speed being less than the first feeding speed;
a plurality of control units each comprising a processing unit and being configured to control the operating unit to form the image on the sheet, the plurality of control units comprising at least a first control unit and a second control unit; and
a selecting unit configured to select one of a first mode and a second mode, wherein:
when the first mode is selected, the plurality of control units control, in cooperation with each other, the operating unit to form the image on the sheet by feeding the sheet through the image forming unit at the first feeding speed;
when the second mode is selected, at least the second control unit controls, without cooperating with the first control unit, the operating unit to form the image on the sheet by feeding the sheet through the image forming unit at the second feeding speed;
when the first mode is selected, all of the plurality of control units are in a running state; and
when the second mode is selected, at least the first control unit is in a sleep state, and at least the second control unit is in the running state.

2. The image processing device according to claim 1, wherein:
each of the plurality of control units is configured to execute a plurality of target functions on image data, and at least one of the plurality of target functions is a printing function in which the image forming unit forms the image on the sheet.

3. The image processing device according to claim 1, further comprising a setting unit that sets a mode to one of a high-speed mode and a power-saving mode, wherein:
the selecting unit selects the first mode when the setting unit sets the mode to the high-speed mode; and
the selecting unit selects the second mode when the setting unit sets the mode to the power-saving mode.

4. An image processing device comprising:
an operating unit comprising:
an image forming unit configured to form an image on a sheet, and
a feeding unit configured to feed the sheet through the image forming unit at a first feeding speed and a second feeding speed, the second feeding speed being less than the first feeding speed;
a plurality of control units each comprising a processing unit and being configured to control the operating unit to form the image on the sheet, the plurality of control units comprising at least a first control unit and a second control unit;
a selecting unit configured to select one of a first mode and a second mode, wherein:
when the first mode is selected, the plurality of control units control, in cooperation with each other, the operating unit to form the image on the sheet by feeding the sheet through the image forming unit at the first feeding speed; and
when the second mode is selected, at least the second control unit controls, without cooperating with the first control unit, the operating unit to form the image on the sheet by feeding the sheet through the image forming unit at the second feeding speed; and
an accepting unit that accepts a job command, commanding to execute a target job relating to forming the image on the sheet, wherein
when the second mode is selected, at least the second control unit executes the target job at the first feeding speed if the target job is one of predetermined jobs, and executes the job at the second feeding speed if the target job is none of the predetermined jobs.

5. The image processing device according to claim 4, wherein:
each of the plurality of control units is configured to execute a plurality of target functions on image data, and
at least one of the plurality of target functions is a printing function in which the image forming unit forms the image on the sheet.

6. The image processing device according to claim 4, further comprising a setting unit that sets a mode to one of a high-speed mode and a power-saving mode, wherein:
the selecting unit selects the first mode when the setting unit sets the mode to the high-speed mode; and
the selecting unit selects the second mode when the setting unit sets the mode to the power-saving mode.

7. An image processing device comprising:
an operating unit comprising:
an image forming unit configured to form an image on a sheet, and
a feeding unit configured to feed the sheet through the image forming unit at a first feeding speed and a second feeding speed, the second feeding speed being less than the first feeding speed;
a plurality of control units each comprising a processing unit and being configured to control the operating unit to form the image on the sheet, the plurality of control units comprising at least a first control unit and a second control unit;
a selecting unit configured to select one of a first mode and a second mode, wherein:
when the first mode is selected, the plurality of control units control, in cooperation with each other, the operating unit to form the image on the sheet by feeding the sheet through the image forming unit at the first feeding speed; and
when the second mode is selected, at least the second control unit controls, without cooperating with the first control unit, the operating unit to form the image on the sheet by feeding the sheet through the image forming unit at the second feeding speed; and
an accepting unit that accepts a job command, commanding to execute a job relating to forming the image on the sheet, wherein:
when the second mode is selected, at least the second control unit executes the job at the first feeding speed if the job includes any of predetermined processes, and executes the job at the second feeding speed if the job includes none of the predetermined processes.

8. The image processing device according to claim 7, wherein:
each of the plurality of control units is configured to execute a plurality of target functions on image data, and
at least one of the plurality of target functions is a printing function in which the image forming unit forms the image on the sheet.

9. The image processing device according to claim 7, further comprising a setting unit that sets a mode to one of a high-speed mode and a power-saving mode, wherein:
the selecting unit selects the first mode when the setting unit sets the mode to the high-speed mode; and
the selecting unit selects the second mode when the setting unit sets the mode to the power-saving mode.

10. An image processing device comprising:
an operating unit comprising:
an image forming unit configured to form an image on a sheet, and
a feeding unit configured to feed the sheet through the image forming unit at a first feeding speed and a second feeding speed, the second feeding speed being less than the first feeding speed;
a plurality of control units each comprising a processing unit and being configured to control the operating unit to form the image on the sheet, the plurality of control units comprising at least a first control unit and a second control unit; and
a selecting unit configured to select one of a first mode and a second mode, wherein:
when the first mode is selected, the plurality of control units control, in cooperation with each other, the operating unit to form the image on the sheet by feeding the sheet through the image forming unit at the first feeding speed; and
when the second mode is selected, at least the second control unit controls, without cooperating with the first control unit, the operating unit to form the image on the sheet by feeding the sheet through the image forming unit at the second feeding speed; and
wherein after the plurality of control units have controlled, in cooperation with each other, the operating unit to form the image on the sheet by feeding the sheet through the image forming unit at the second feeding speed when the first mode is selected, the first control unit enters a sleep state.

11. The image processing device according to claim 10, wherein:
   each of the plurality of control units is configured to execute a plurality of target functions on image data, and
   at least one of the plurality of target functions is a printing function in which the image forming unit forms the image on the sheet.

12. The image processing device according to claim 10, further comprising a setting unit that sets a mode to one of a high-speed mode and a power-saving mode, wherein:
   the selecting unit selects the first mode when the setting unit sets the mode to the high-speed mode; and
   the selecting unit selects the second mode when the setting unit sets the mode to the power-saving mode.

* * * * *